United States Patent
Tektumanidze et al.

(10) Patent No.: US 9,585,036 B1
(45) Date of Patent: Feb. 28, 2017

(54) DETERMINING CELL SITE PERFORMANCE IMPACT FOR A POPULATION OF CELL SITES OF A MOBILE WIRELESS DATA NETWORK

(71) Applicant: United States Cellular Corporation, Chicago, IL (US)

(72) Inventors: Giya Tektumanidze, Riverwoods, IL (US); Zaza Surmava, Barrington, IL (US); Narothum Saxena, Hoffman Estates, IL (US); Michael Irizarry, Barrington Hills, IL (US); Denise Lintz, North Aurora, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 14/976,742

(22) Filed: Dec. 21, 2015

(51) Int. Cl.
*H04W 24/06* (2009.01)
*H04W 24/00* (2009.01)

(52) U.S. Cl.
CPC .................. *H04W 24/06* (2013.01)

(58) Field of Classification Search
CPC ..... H04W 24/06; H04W 24/08; H04W 24/02; H04W 24/04; H04W 24/00
USPC ............... 455/67.11, 115.1, 410, 423, 456.1; 370/241
See application file for complete search history.

(56) References Cited

U.S. PATENT DOCUMENTS

2013/0053023 A1* 2/2013 Meredith .............. H04W 24/08
455/423

* cited by examiner

Primary Examiner — Inder Mehra
(74) Attorney, Agent, or Firm — Leydig, Voit & Mayer, Ltd.

(57) ABSTRACT

A method is described for identifying and prioritizing, for remediating, impactful problems in a mobile wireless communications network. The method includes rendering a human observable representation of problem impact at particular geographic units within a grid corresponding to a geographic area of interest. The method includes tabling mobile wireless communication network data in a database, generating a problem impact grid for a geographic area of interest sub-divided into sub-areas of specified dimensions and rendering a listing representing a prioritized set of mobile wireless communication network issues arranged in accordance with magnitude of values assigned to sub-areas of the problem impact grid.

19 Claims, 4 Drawing Sheets

- 200 — Dropped Call Percentage
- 210 — Key Performance Indicators (RSRQ, RSRP, signal strength, Pilot0_EC_IO)
- 220 — Dropped Call Percentage
- 230 — Data Throughput
- 240 — Data Sessions
- 250 — Data Attempts
- 260 — Data Volume
- 270 — Transactions (per Second)
- 280 — Messages (per Second)
- 290 — CPU Usage
- 295 — Memory Usage

FIG. 1

| # | Label |
|---|---|
| 200 | Dropped Call Percentage |
| 210 | Key Performance Indicators (RSRQ, RSRP, signal strength, Pilot0_EC_IO) |
| 220 | Dropped Call Percentage |
| 230 | Data Throughput |
| 240 | Data Sessions |
| 250 | Data Attempts |
| 260 | Data Volume |
| 270 | Transactions (per Second) |
| 280 | Messages (per Second) |
| 290 | CPU Usage |
| 295 | Memory Usage |

- 400: Apply Threshold Test to Relevant Geographic Location-Specific Data Points to Create Problem Identification Grid (See Fig. 5) (assign "1"/"0" value to each square based upon True/False result of Threshold test applied to geographic area corresponding to square)
- 410: Generate Initial Problem Extent Severity Grid from Problem Identification Grid (See Fig. 6) (count "1" values assigned to each grid square and 8 surrounding neighboring squares)
- 420: Generate Amplified Problem Extent Severity Grid from Initial Problem Extent Severity Grid – "Problem Impact Grid" (See Figs. 7 and 8) (sum of values assigned to each grid square and 8 surrounding neighboring squares AND multiply by a specified amplification value, each intermediate value assigned to a grid square that exceeds a specified threshold value)

FIG. 3

- 300: Acquire/Table Mobile Wireless Data Network Performance Parameter Data Point Sets (See FIG. 2)
- 310: Generate Problem Impact Grid for Geographic Area of Interest (See FIG. 4)
- 320: Render, Based Upon Problem Impact Grid, Listing Representing Prioritized Set of Specific Network Performance Issues Arranged According to Impact Scoring of Relevant Grid Squares

| 0 | 0 | 0 | 0 | 0 | 0 | 0 | 0 | 0 |
|---|---|---|---|---|---|---|---|---|
| 0 | 0 | 1 | 0 | 1 | 0 | 1 | 0 | 0 |
| 0 | 0 | 0 | 0 | 0 | 0 | 0 | 0 | 0 |
| 0 | 0 | 1 | 0 | 1 | 0 | 1 | 0 | 0 |
| 0 | 0 | 0 | 0 | 1 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 5

| 0 | 1 | 1 | 2 | 1 | 2 | 1 | 1 | 0 |
|---|---|---|---|---|---|---|---|---|
| 0 | 1 | 1 | 2 | 1 | 2 | 1 | 1 | 0 |
| 0 | 0 | 1 | 4 | 2 | 4 | 2 | 2 | 0 |
| 0 | 0 | 1 | 3 | 2 | 2 | 1 | 1 | 0 |
| 0 | 0 | 1 | 3 | 2 | 3 | 1 | 1 | 0 |
| 0 | 0 | 0 | 1 | 1 | 1 | 0 | 0 | 0 |
| 0 | 0 | 0 | 0 | 0 | 0 | 0 | 0 | 0 |

FIG. 6

| 2 | 4 | 8  | 8  | 10 | 8  | 8  | 4 | 2 |
|---|---|----|----|----|----|----|---|---|
| 4 | 8 | 16 | 16 | 20 | 16 | 16 | 8 | 4 |
| 4 | 8 | 17 | 18 | 23 | 18 | 17 | 8 | 4 |
| 4 | 8 | 18 | 20 | 26 | 20 | 18 | 8 | 4 |
| 2 | 4 | 11 | 14 | 19 | 14 | 11 | 4 | 2 |
| 1 | 2 | 6  | 8  | 11 | 8  | 6  | 2 | 1 |
| 0 | 0 | 1  | 2  | 3  | 2  | 1  | 0 | 0 |

FIG. 7

| 2 | 4 | 8  | 8  | 10 | 8  | 8  | 4 | 2 |
|---|---|----|----|----|----|----|---|---|
| 4 | 8 | 32 | 16 | 40 | 16 | 32 | 8 | 4 |
| 4 | 8 | 17 | 18 | 23 | 18 | 17 | 8 | 4 |
| 4 | 8 | 36 | 20 | 52 | 20 | 36 | 8 | 4 |
| 2 | 4 | 11 | 14 | 38 | 14 | 11 | 4 | 2 |
| 1 | 2 | 6  | 8  | 11 | 8  | 6  | 2 | 1 |
| 0 | 0 | 1  | 2  | 3  | 2  | 1  | 0 | 0 |

FIG. 8

DETERMINING CELL SITE PERFORMANCE IMPACT FOR A POPULATION OF CELL SITES OF A MOBILE WIRELESS DATA NETWORK

FIELD OF THE INVENTION

This invention relates generally to the field of mobile wireless communications networks. More particularly, the invention is directed to supporting mobile wireless data communication services (such as those supporting data flows to/from smart phones) in such networks, and more specifically to maintaining a collection of infrastructure components (e.g. cell sites) at peak performance as a whole, which may require tradeoffs favoring some cell sites over others in view of observed usage and importance to users of a group of cell sites covering a wide geographic area.

BACKGROUND OF THE INVENTION

Changes in usage patterns by customers of mobile wireless communications services, with an increased emphasis on smart phone-based data traffic as opposed to voice, have placed unprecedented demand upon underlying physical network infrastructures (e.g. cell sites) that support such services. Proliferation of smart phones and their use to carry out high volume/data-rate communications—including streaming video transmissions—has resulted in exponential growth in the volume of data flowing over wireless networks. The substantially increased data transmission volume via existing physical networks challenges the capabilities of the infrastructure to such a degree that choices often need to be made between desirable upgrades/remedial measures for many, if not all, cell sites and/or associated routers/servers. The increased volume of data communications presents a challenge for service providers who must ensure reliable mobile wireless service for most, if not all, users.

Moreover, users have become accustomed to receiving mobile wireless service at unprecedented levels of quality and reliability. The high degree of reliability achieved by mobile wireless services has resulted in many mobile wireless subscribers foregoing conventional landline service. Such subscribers rely heavily upon mobile wireless service to meet their communication needs. Given the increased reliance of subscribers, it is imperative for the underlying mobile wireless network infrastructure to be properly maintained. When parts of the mobile wireless network infrastructure are unable to adequately support subscriber needs at particular locations in the network, such parts (e.g., cell sites or portions thereof) must be identified. Thereafter, the cause(s) of the identified performance failure need to be identified, and solutions are proposed.

Mobile wireless network service providers possess limited resources for maintaining and improving their network infrastructure. As a consequence, mobile wireless network service providers are challenged to quickly and accurately identify, with a high level of confidence, changes (e.g. remedies and upgrades) to components that are most impactful on increasing an overall level of user satisfaction and quality of voice/data communication services rendered by the mobile wireless network as a whole.

A wide variety of network operation information is consulted by network maintenance engineers and technicians. Key Performance Indicators (KPIs) are a type of network operation information used to measure the performance and capacity of wireless networks. Actual data throughput demand, and the mobile wireless network's ability to meet the data throughput demand are important Key Performance Indicator (KPI) types. Examples of other KPI types include: data sessions, transactions per unit time (e.g., second), disk usage, CPU usage, memory usage, data attempts, data sessions, data volume, and messages per unit time. Vast quantities of KPI data points are acquired for processing/analyzing during the course of a period of review for purposes of analyzing user data throughput demand on various mobile wireless network components and the mobile wireless network components' ability to meet such demand.

Network service providers do not have unlimited access to resources for addressing every need evidenced by acquired KPI's. A challenge to maintaining a mobile wireless data network, based upon monitored performance and capacity measurements, is to ensure proper allocation of limited resources for repairing and/or upgrading existing network infrastructure components. However, identifying points/causes of poor data transmission service at a particular part of a mobile wireless communication network is insufficient when a quantity of such points exceeds current resources that a network service provider can commit to address identified needs.

A first challenge, to conducting a meaningful analysis and proposing a beneficial long term response to identified problems/needs in a mobile wireless data network, is the massive volume of raw network performance (e.g., KPI) data acquired by various components of the mobile wireless network. During the course of an evaluation period, a mobile wireless data network management system acquires millions of potentially useful data points for processing. It would take years for such information to be evaluated manually. Therefore, some form of automated evaluation process is essential.

Another challenge involves determining relative importance of proposed remedial efforts to operation of the mobile wireless communications network as a whole. In an environment of limited resources for maintaining/improving network component operation, tools are needed to quickly and reliably compare the value of contemplated remedial/improvement measures applied to particular network components.

SUMMARY OF THE INVENTION

Embodiments of the invention are used to provide a method, non-transitory computer readable medium, and a computer system configuration facilitating and performing operations for computer-automated identification of impact of particular problematic mobile wireless communication network components (e.g. cell sites) to facilitate rendering an enumeration of network maintenance activities.

More particularly, examples are described herein of a method (also computer-readable medium and configured computer system) for rendering, by a computerized mobile wireless data network performance parameter system, a two-dimensional rendering of geographical region of interest wherein the two-dimensional rendering is divided into a set of cells.

The method for rendering a human observable representation of problem impact at particular geographic units within a grid corresponding to a geographic area of interest includes tabling mobile wireless communication network data in a database. There the method includes generating, by the problem impact server, a problem impact grid for a geographic area of interest sub-divided into sub-areas of specified dimensions. The generating a problem impact grid for a geographic area of interest comprises:

creating a problem identification grid by applying a threshold test to the mobile wireless communication network data corresponding to each sub-area of the geographic area of interest, wherein a same non-zero value is assigned to each sub-area meeting the threshold test and otherwise assigning a zero value to each sub-area not meeting the threshold test, generating an initial problem extent severity grid by applying a first aggregating operation wherein, for each sub-area in the initial problem extent severity grid, an initial severity value is generated by totaling the values in the problem identification grid corresponding to: (1) the sub-area and (2) each adjacent neighboring sub-area, and generating the problem impact grid, from the initial problem extent severity grid by: initially performing a second aggregation operation wherein, for each sub-area in the problem impact grid, an intermediate summed value is generated by totaling the values in the initial problem extent severity grid corresponding to: (1) the sub-area and (2) each adjacent neighboring sub-area, and amplifying, by an amplification factor, the intermediate summed value for each sub-area corresponding to a sub-area assigned a non-zero value during the creating a problem identification grid. The method further includes rendering a listing representing a prioritized set of mobile wireless communication network issues arranged in accordance with magnitude of values assigned to sub-areas of the problem impact grid.

The method continues by performing the step of applying the identified most impactful action to a cell site associated with the most impactful action.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Exemplary embodiments of the invention described herein acquire and process a combination of mobile wireless data network performance parameter data point sets to render an identification of problematic geographic areas based upon a combination of level of usage (density) of particular areas (cell site/sector) and available effective solutions to address problems impacting mobile wireless communications in particular identified areas. The most impactful problem, once identified, becomes the target of appropriate remedial activities by network engineers/technicians.

The exemplary system described herein identifies, using an impact scoring algorithm, one or more of the following: a level of impact of a cell site issue in a particular geographic area (a cell on a two-dimensional geographic map), density of cell sites within particular geographic area (high density of cell sites in a given area lessens impact of a failed site/sector), a site/sector in greatest need of repair in cases of multiple malfunctioning cells/sectors, a geographic area affected by a problem with a site/sector, and a location at which to install a new cell site (to remedy one or more cell site problems in a general geographic area). The proposed system and operations achieve the above-described functionality using a scoring methodology on a two-dimensional geographic grid where an integer value is assigned to each grid square, wherein the value represents problem impact within the particular geographic region corresponding to the grid square. The problem impact score is indicative of BOTH the existence of a problem AND an extent of the problem within a relatively continuous area corresponding to multiple squares of a grid representing a geographic area of interest. The final value generated for each square in the problem impact grid may be used to indicate a relative priority for taking a remedial action with respect to a problem impacting the particular geographic area corresponding to the grid square. Thus, after generating problem impact scores to each square grid, a ranked listing of geographic regions are generated according to the relative priorities indicated by the problem impact scores assigned to each grid square for a geographic area of interest. Generating problem impact scores contrasts with merely identifying an issue that indicates a need to perform a remedial action on a given mobile wireless communication network component (e.g., cell site/sector)—without providing any type of indication of relative priority of an issue.

Figure 1:
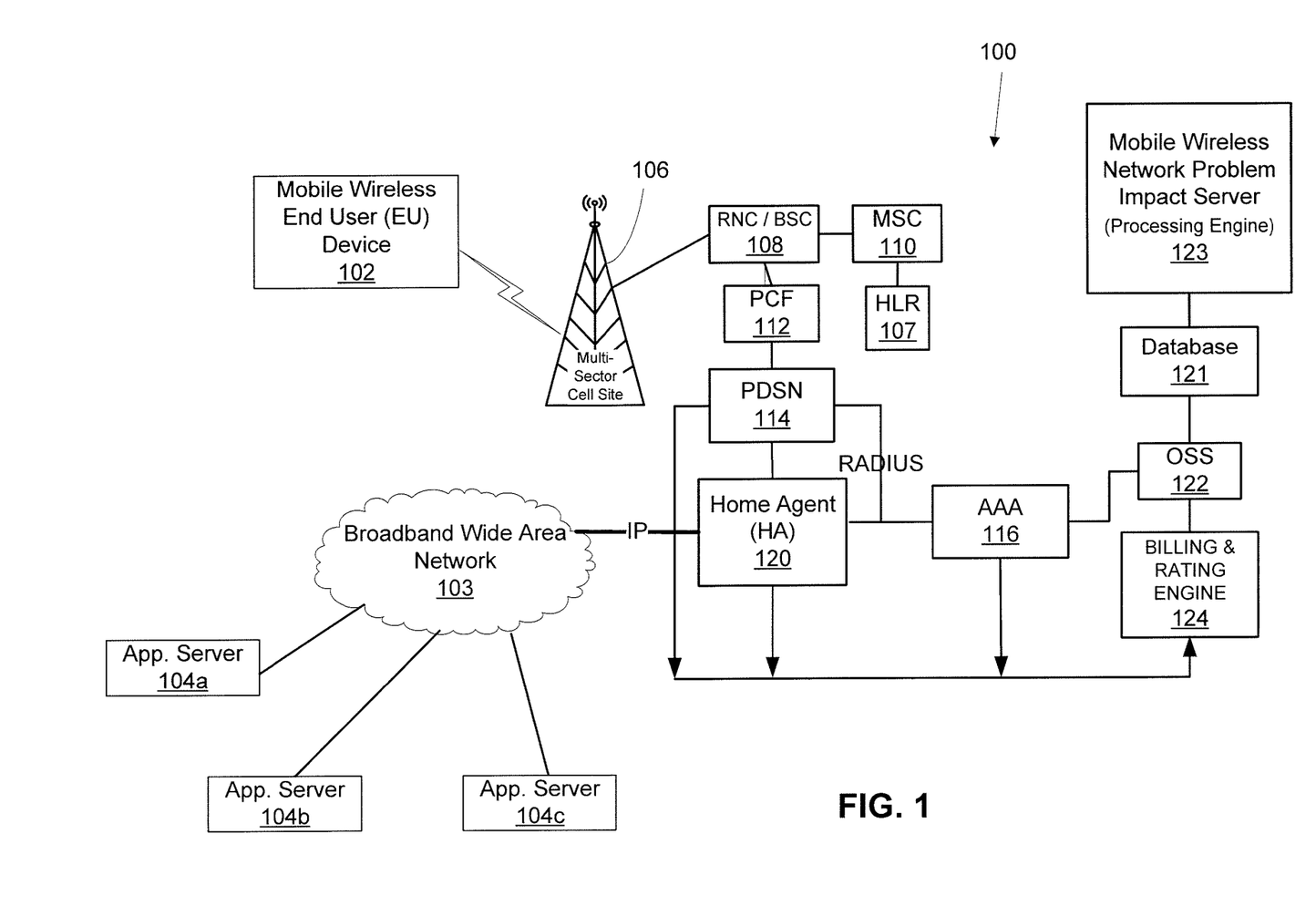
FIG. 1 is a schematic diagram illustrating a mobile wireless data network environment interfaced to a broadband digital data network providing access to a variety of application servers.

Turning to FIG. 1, an exemplary network environment is schematically depicted that includes monitoring and management components facilitating acquiring and processing a variety of performance data for a plurality of cell sites/sectors in accordance with the aforementioned mobile wireless communications network problem identification and impact scoring functionality. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, or similar telecommunication standards configured to deliver voice and data services to mobile wireless end user devices such as, a mobile wireless device 102 depicted in FIG. 1 carrying out wireless communications via a base station 106 (also referred to as a base transceiver station or cell site). While only a single base station 106 is depicted in FIG. 1, the mobile wireless network system 100 includes hundreds of such stations per RNC/BSC 108 and, therefore, thousands of such stations per operator network. The scaling of base stations within the network continues to grow as smaller base station solutions continue to emerge through wireless innovation. (i.e., picocells, femtocells, hotspot solutions, etc). Each of the base stations is capable of acquiring thousands, even millions, of data points during a period of observation used by network engineers and technicians to develop a maintenance schedule/plan to correct problems identified at particular geographic locations and/or cell sites (including related network infrastructure components) in the network.

The mobile wireless network system 100 provides mobile wireless data network services via the base station 106 to the mobile device 102. The mobile device 102 is any of a variety of devices including, for example: a mobile phone, a PDA, or a mobile computer (e.g., a laptop, notebook, notepad, tablet, etc.) having mobile wireless data communication capability.

The mobile wireless system 100 includes a plurality of base stations, such the base station 106. The base station 106, by way of example, includes radio bearer resources and other transmission equipment necessary for wireless communication of information between the mobile device 102 and other network elements. The base station 106 includes one or more transceiver-antenna combinations. In the case of sectorized base stations, the radio access components typically include two or more transceiver-antenna combinations configured to cover particular parts of an area (actually a volume of space, discrete coding scheme, or sinusoidal phase offset) covered by the base station 106. A typical arrangement for a cellular communications base station is a "tri-sector" arrangement where three static areas are arranged in carefully engineered "n" degrees of rotational displacement from one another. Base stations, such as base station 106, come in a variety of forms, and there is no intention to limit the scope of the invention to any particular arrangement. More generally, there is no intention to limit the invention to the exemplary environment schematically depicted in FIG. 1 since the described management system and scheme for detecting problematic geographic regions, and cell sites (base stations) and specific problematic sectors within the cell sites associated with the problematic geographic regions, applies to other types of wireless communications systems including, without limitation, 3GPP2, EVDO and LTE based mobile wireless communication network systems.

The mobile wireless network system 100 is, in turn, connected to a broadband wide area network 103. The broadband network 103 provides digital data connectivity to a variety of application servers 104a, 104b, and 104c. The application servers 104a, 104b, and 104c are representative of millions of application server systems (both in-service operator network servers and out-of-operator network servers) providing a variety of Web-based services via the Internet.

Turning attention to particular components of the mobile wireless system 100, where logical connections are identified by connection lines (not necessarily representing the physical links through which identified components communicate), a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the base station 106 within the system 100 is carried out, for example, by a radio network controller (RNC) or a base station controller (BSC), identified in FIG. 1 as RNC/BSC 108. The RNC/BSC 108 manages the radio traffic between neighboring ones of a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use data network communication resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

Upon completing the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102.

The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine permissions for users associated with the account with which the mobile device 102 is associated. In accordance with an illustrative embodiment, the OSS 122 collects raw performance (e.g., KPI) parameter data point sets from any of a variety of mobile wireless data network components, including base stations, gateways, etc. With reference to FIG. 1, such information is received, for example, from PDSN 114, AAA 116, HA 120, RNC 108 and PCF 112. To ensure availability of the OSS 122 resources for other management functions, the OSS 122 stores the received parameter data point sets in a data point set database repository 121. Examples of the types of stored data in the database 121 are provided in FIG. 2 described herein below. While the information stored in the database 121 is stored via the OSS 122 in the illustrative example, it is expressly noted that in alternative embodiments, such information is acquired/stored via alternative network entities. Also, the manner in which such information is acquired varies in accordance with various embodiments including, for example, simple network management protocol (SNMP) polling by a networked server separate from the OSS 122. Such arrangement is particular valuable in physical network arrangements comprising multiple OSS nodes handling network equipment provided by different vendors. In that case, the database repository 121 operates as a central storage location for all acquired/processed network performance parameter data used to build network maintenance lists in accordance with examples of the operation of a mobile wireless network problem impact server (problem impact server) 123.

Figure 3:
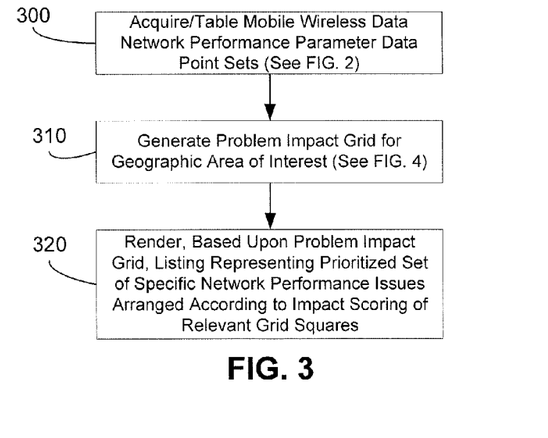
FIG. 3 is a flowchart summarizing a set of steps for providing a prioritized listing representing existing mobile wireless communication network issues for carrying out focused remedial activities on mobile wireless communications network infrastructure (e.g. cell sites) in accordance with an identification of a geographical area of highest performance problem impact for a geographic area of interest.
Figure 4:
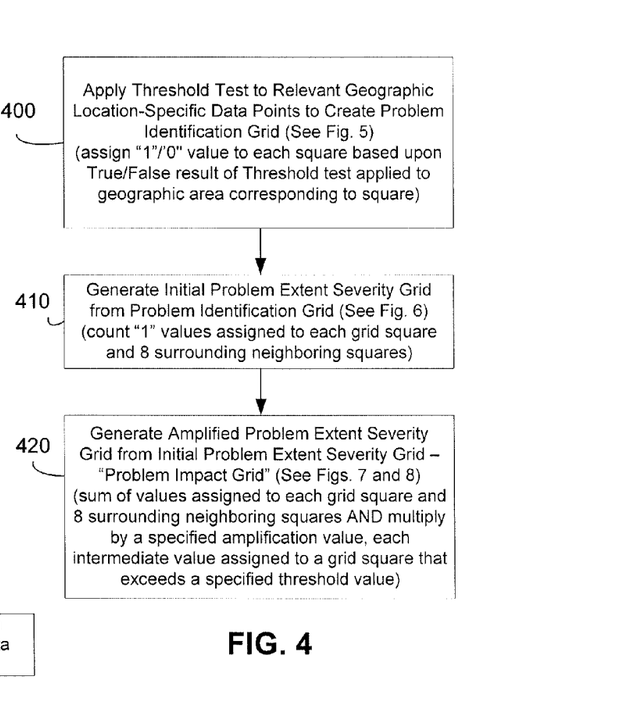
FIG. 4 is a flowchart summarizing an exemplary set of steps performed in accordance with identifying a geographic area of highest performance problem impact from performance data sets of FIG. 3.

The problem impact server 123 is implemented in the form of a programmed server computer system including a non-transitory computer readable medium having computer executable instructions executed by a processor of the problem impact server 123 to carry out the operations described herein with reference to FIGS. 3 and 4. The problem impact server 123 is configured to retrieve stored data point sets from the database repository 121 and then perform the operations described herein to render a prioritized listing of problematic geographic areas.

In accordance with an exemplary embodiment, the mobile wireless system 100 further includes a billing and rating engine 124. As indicated in FIG. 1, the billing and rating engine 124 is a back office system that is configured to receive certain information, based upon subscriber usage information received from other components of the system 100. The billing and rating engine 124 communicates such information to the OSS 122. By way of example, the billing and rating engine 124 monitors information provided by the HA 120 indicating a particular mode within which the mobile device 102 is (or has been) operating—as well as the quantity of data passed by the mobile device 102 while operating in the indicated mode. The billing and rating engine 124 issues a notification to the OSS 122 that the mobile device 102 is (or has been) operating in a particular mode. The indicated particular operational mode of operation sent to the OSS 122, if not permitted under the current user profile for the mobile device 102, initiates immediate and/or delayed responsive actions by the mobile wireless system 100 to ensure that the mobile device 102 operates in accordance with the terms of a current user agreement.

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Figure 2:
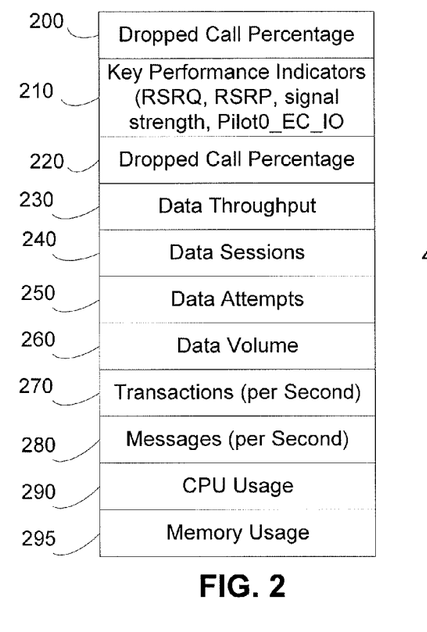
FIG. 2 is an exemplary set of data types acquired, stored, processed and analyzed for a particular time period and mobile wireless data network element in exemplary systems.

Turning to FIG. 2, an exemplary set of mobile wireless communication network data information types are provided that may be stored in the database 121 in association with the operation of the problem impact server 123 system described herein. Such problem impact identification and prioritization system is carried out by the combined operation of the database 121 and the problem impact server 123 comprising programmed processing hardware for identifying/providing an enumerated/prioritized listing of problematic geographic areas for the mobile wireless data network depicted, by way of example, in FIG. 1. By way of example, data points corresponding to the information types summarized in FIG. 2 are received from mobile devices and/or base stations and forwarded through the RNC 108 (eventually) to the OSS 122. An exemplary data format for received data points include a timestamp (time period, such as a date and hour within which the data was acquired) and network element ID (identifying a source of the data), a data type identifier, and a data point value.

The problem impact server 123, described herein with reference to FIGS. 3 and 4, is intended to utilize a variety of data. Various time spans are potentially associated with the various types of data identified in FIG. 2. Such time spans include a minute, an hour, a day, etc. Also, the database entry for the time period can represent averaged data over the period of a day (e.g., average of 60 values accumulated once per minute over an hour). Thus, the time period represents various measures within various time spans in accordance with alternative embodiments. Moreover, such data can be provided a single data point at a time or, alternatively, bundled into a composite data message that is received and unpacked by, for example, the OSS 122 before storing the individual data points within the database 121.

With particular reference to FIG. 2, a set of exemplary performance parameters are identified for a mobile wireless network component. For each listed performance parameter, the value acquired and stored in the database 121 represents a measured quantity for a specified time span and mobile wireless data network component. The performance parameters are potentially used to detect any type of problem for purposes of determining an impact of the problem. In that regard the performance parameters may indicate an actual failure of a network component. However, the performance parameters may also measure a degree to which particular mobile wireless communication network components have reached/exceeded capacity limits. A data element for a particular square in a geographic grid may represent a dropped call percentage 200 for a time period. A set of key performance indicators (KPIs) 210 specify any of a variety of well-known radio signal quality measures including: Reference Signal Received Quality (RSRQ), Reference Signal Received Power (RSRP), signal strength, Pilot0_EC_IO, etc. A number of LTE phones with CDMA/EVDO fallback capability 220 indicate a quantity (raw number or percentage of population) of mobile wireless devices capable of operating in CDMA and/or EVDO in a geographic area having poor LTE signal coverage. The existence of multiple types of performance measure data types in the database 121 facilitates potentially defining a variety of tests for determining whether a particular square within a geographic grid is experiencing a problem impacting users. Such tests may include: (1) simple single variable threshold tests, and/or (2) multi-variable logical threshold tests. The tests, described herein below with reference to FIGS. 3 and 4, evaluate to a simple true/false logical value (corresponding to a 1/0 in the geographic grid described herein below with reference to FIG. 5.

With continued reference to FIG. 2, several additional exemplary data types are identified that can be used by the server 123 to identify a problem impacting mobile wireless users. A data throughput parameter 230 is a measure of a quantity of data (e.g. bits or bytes) passing through and/or processed by a mobile wireless network component during a specified time span (e.g., Mbps). A data sessions parameter 240 is a quantity of distinct sessions initiated during a time span. A data attempts parameter 250 is a quantity of distinct requests for data by mobile devices. A data volume parameter 260 is a quantity of data passing through a particular network node. A transactions parameter 270 is a quantity of unique request/response pairs processed by a network node. A messages parameter 280 is a quantity of messages passing through or handled by a network node. A CPU usage parameter 290, for a particular network component, represents the percentage (e.g., maximum or average) of non-idle process CPU cycles over a time period—a potential indicator of whether additional, or more powerful, processors are needed for the component. A memory usage parameter 295 represents the quantity or percentage of memory used over a time period (e.g., maximum or average usage)—potential indicator of whether additional memory needs to be added to the component. A disk usage parameter 166 represents the amount (quantity or percentage) of disk memory used over a time period (e.g., maximum or average).

Yet other performance data information types are contemplated for facilitating identifying and/or prioritizing problems impacting service quality for users of a mobile wireless communication network. As such, the performance data information types identified in FIG. 2 are intended to be exemplary.

FIGS. 3 and 4 summarize operations performed by a mobile wireless communications network support and maintenance system, without regard to actual order and/or number of repetitions of the identified operations, for providing a prioritized listing of network issues to be addressed by network engineers/technicians. The prioritized listing enumerates such issues according to a degree to which a problem impacts service in a particular geographic area. Such issues and their corresponding geographic location are determined by the problem impact server 123 operating upon a set of performance parameter data points, such as those identified in FIG. 2 discussed herein above, relating to operation of a mobile wireless data network such as the one illustratively depicted in FIG. 1. The operation of the problem impact server 123 is described herein below with reference to FIGS. 3 and 4.

During 300, the system acquires and tables a set of mobile wireless data network performance parameter data points. By way of example, during step 300 a set performance parameter data points, of any one or more of the performance data types listed in FIG. 2, are acquired for a geographical area covering a plurality (e.g. hundreds or even thousands) of cell sites. When stored in database 121, each data point is assigned to a particular geographical location.

The location assigned to the data point depends upon the type of information being stored. In the case of signal characteristics, the location of interest is a location of a mobile wireless device at the time of acquiring the signal information corresponding to the data point. In other cases, relating to network data processing components (e.g., data communications routers and agent hardware components) the location is typically the location of the base station with which the processing components are associated. It is contemplated that the network system and described operations are primarily concerned with problem impact relating to signal quality of the air link between a mobile wireless device and a connected radio access node associated with a particular base station, and in such cases the location of interest is the current location of the mobile wireless device at the time of receiving/generating the radio signal/connection information corresponding to the data point.

During 310, described in detail herein below with reference to FIG. 4, the problem impact server 123 renders a problem impact grid for a geographical area of interest based upon data points acquired and stored according to 300. An exemplary geographical area of interest corresponds, for example, to a specified market and includes data rendered from mobile wireless device connections to a set of cell sites within the particular specified market (e.g., a designated urban area and its surrounding suburbs). In other examples, the geographical area of interest is several hundred or even several thousand square miles.

In general, the problem impact grid generated during 310 identifies, with regard to a particular problem associated with the threshold criterion specified and applied during 310, specific areas (squares in a grid) within the geographic area of interest and associated degree of impact of the particular problem (e.g., dropped call number/percentage) based upon (recent) historical information acquired by the problem impact server 123 from the database 121.

During 320 the problem impact server 123 renders, from the problem impact grid (also renderable in viewable/tangible form) generated during 310, a listing representing a prioritized set of specific network component performance issues arranged in order of highest to lowest impact based upon the impact score values assigned to squares of the problem impact grid rendered during the problem impact scoring operations executed by the problem impact server 123 during 310. The listing guides decision-making and remedial actions performed by network engineers and technicians with respect to the mobile wireless communication network components associated with the geographical area of interest.

Turning to FIG. 4, a set of steps are summarized for carrying out the problem impact grid generating operation on the raw performance parameter data point set during 310 of the computer-implemented operations summarized in FIG. 3. During 400, the problem impact server 123 applies a threshold test/criterion to one or more of the data types described with reference to FIG. 2 to create a "problem identification grid" (see FIG. 5 described below) for the geographic area of interest. The criterion and grid parameters include the following: a logical threshold test (indicating the presence of a problem), to be performed on particular data element types, that evaluates to either True (1) or False (0); a time frame of interest (e.g. the past week); a geographic area of interest; and a grid square granularity (e.g. 1 km square). By way of example, the logical threshold test and for identifying a problematic square within the area of interest relates to dropped calls. More particularly, a particular square is identified as having a "dropped call problem" if, based upon call records within the region corresponding geographic region during the last week, more than 1 percent of the calls are dropped. Thus, a square in the grid is assigned a logical "True" state (e.g., a value of "1") if the data points associated with the square during the past week indicate a dropped call rate exceeding 1 percent. Another example of a threshold test for a problematic square in the grid for a geographic area of interest is where registered "insufficient attempts" exceed 10 percent.

Additionally, more complex logical threshold criteria are contemplated based upon multiple data types. For example, a particular square must have at least 1000 data points and have a drop rate exceeding 1 percent to be identified as problematic. Another example for a multi-variable threshold test for identifying a problematic square combines: drop call rate (e.g. exceeds 5 percent), customers in area (e.g. at least 10 customers having billing address in square), and data usage (at least 5 high data rate/volume users in square). Other examples include threshold tests, applied to data points obtained for specified geographic unit squares, based upon one or more thresholds relating to: insufficient call attempts, disconnections, KPI parameter values, user demographics, number of customers, total calls, data volume per hour, etc. Thus, it is contemplated that a wide variety of logical criteria will be used, in various implementations, to generate the problem identification grid during 400.

Figure 5:
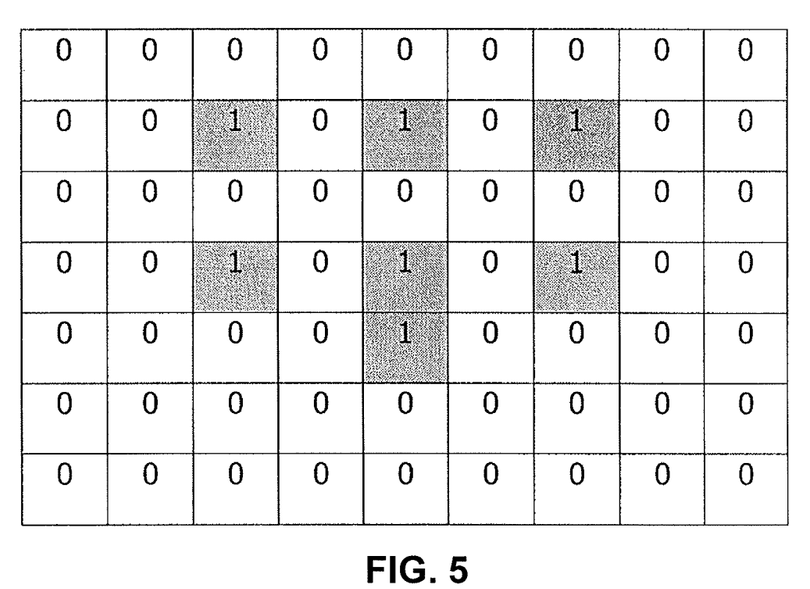
FIG. 5 is an exemplary problem identification grid for a geographic area of interest in accordance with an initial operation carried out during 400 of FIG. 4.

Turning briefly to FIG. 5, an exemplary problem identification grid is depicted for an area of interest divided into a 7 by 9 set of squares. The squares having a "1" correspond to particular sub-regions, within the overall geographic area of interest, where a defined problem threshold (e.g., dropped call percentage over the past week exceeds 1 percent) has been met by data points from the database 121 processed by the problem impact server 123. In the example, the threshold is met in 7 of the 63 total squares within the area of interest. Moreover, while the blocks are generally spread apart by at least one "non-problematic" square, two of the problematic squares are located adjacent to one another.

Returning to FIG. 4, during 410 the problem impact server 123 executes a counting operation with regard to each square (and nearest surrounding neighboring squares) within the problem identification grid. The result of 410 is an "initial problem extent severity grid." In particular, for each square, the number of "1" values are counted in the 3 by 3 region containing a current square and the 8 adjacent squares surrounding the current square. The problem impact server 123 stores, for each one of the squares of the grid, the resulting count value in a data structure (e.g., a 7 by 9 array for the example in FIG. 5) corresponding to the summed results of 410.

Figure 6:
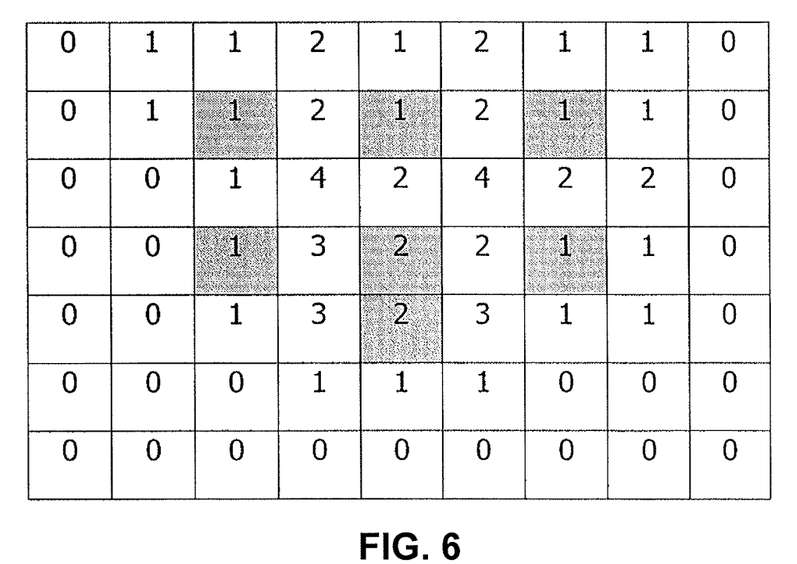
FIG. 6 is an exemplary initial problem extent severity grid for a geographic area of interest in accordance with an initial counting operation carried out during 410 of FIG. 4.

Turning briefly to FIG. 6, an exemplary initial problem extent severity grid is provided that is generated by the server 123 during 410. The above described "counting" operation on 3 by 3 neighboring square sets is readily observable from a comparison of values assigned to corresponding squares FIGS. 5 and 6.

Returning to FIG. 4, during 420 the problem impact server 123 executes a two-step summation/conditional amplification operation with regard to each square within the initial problem extent severity grid generated during 410. The result of 420 is an "amplified problem extent severity grid" also referred to herein as the "problem impact grid" that provides a final set of values for squares within the grid corresponding to the geographic area of interest. First, the server 123 adds together, for each square, the values from the squares in the 3 by 3 region containing a current square and the 8 adjacent squares surrounding the current square. The problem impact server 123 stores, for each one of the squares of the grid, the resulting sum in an intermediate summed value data structure. See FIG. 7 representing the intermediate grid values as a result of the summation of current and surrounding squares in the initial problem extent severity grid depicted in FIG. 6.

Figure 7:
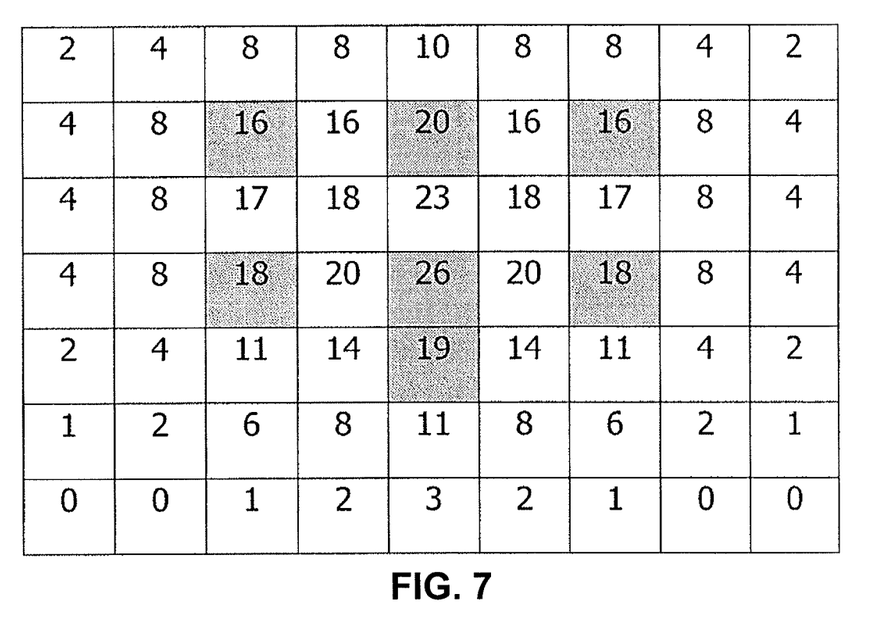
FIG. 7 is an exemplary intermediate grid for a geographic area of interest in accordance with a summing operation carried out during a first part of 420 of FIG. 4.

Turning to FIG. 7, it is shown that the values in 3 by 3 sets of neighboring blocks are summed to render an intermediate count value for each square in accordance with count values assigned to squares depicted in FIG. 6.

Second, during 420 the server 123 multiplies, by an amplification factor (e.g., 2), the summed value for each grid square of the intermediate summed value data structure corresponding to a square fulfilling the threshold test during 400. The problem impact server 123 stores the resulting summed/conditionally amplified value in a data structure (e.g., a 7 by 9 array corresponding to the grid depicted in FIG. 8) corresponding to the "problem impact grid".

Figure 8:
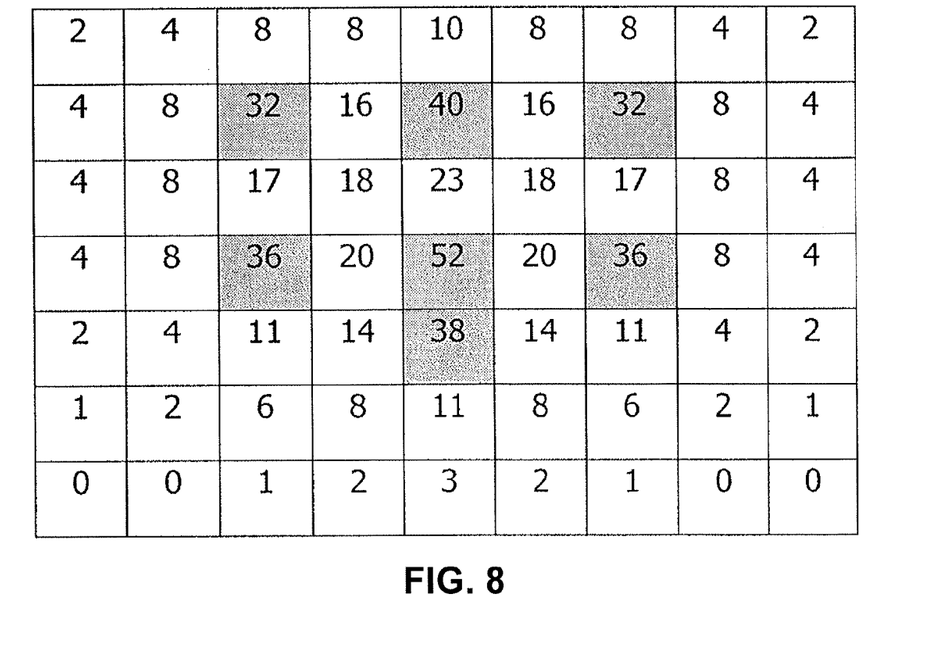
FIG. 8 is an exemplary problem impact grid for a geographic area of interest in accordance with a conditional amplification operation carried out during a second part of 420 of FIG. 4.

Turning to FIG. 8, it is shown that intermediate count values depicted in FIG. 7 corresponding to squares meeting the threshold test during 400 (i.e. the seven shaded blocks) have been conditionally doubled (in this case the amplification factor is 2). The results of step 420 are thereafter stored by the server 123 for use during step 320 (described previously herein above. The described problem impact server 123 uniquely identifies/emphasizes areas that are not necessarily identified by the initial threshold test during 400, but rather gain importance because of their proximity to multiple regions meeting the initial threshold test. For example, in FIGS. 7 and 8, the two blocks assigned a value "20" were not even identified as problematic (i.e. assigned a value of "1") during 400. However, due to their proximity to multiple squares (i.e., "3") that meet the initial threshold test during 400, the importance of problem impact in these additionally identified blocks (assigned a value of 20 in FIGS. 7 and 8) is drawn out by the series of operations performed by the server 123, during 410 and 420, on the problem identification grid rendered during 400.

Thus, operations performed by the server 123 are described for identifying problem impact in a geographic area of interest comprising a plurality of cell sites. The series of operations, beginning with identification of grid squares corresponding to geographic locations of specified size (e.g. a square kilometer) where mobile wireless device user data meets a specified threshold test, expanding the initial extent of the problematic regions (squares), and then amplifying the problem value assigned to each one of the squares meeting the initial threshold test. The resulting problem impact grid square values are thereafter ranked and rendered for implementing remedial measures addressing a problem corresponding to the initial threshold test (applied during 400). Such problems include: dropped calls, insufficient signal strength, interference, etc. The nature of the described system enables users to implement an extensive and a boundlessly extensible set of threshold tests during 400 to address a wide variety of mobile wireless communication network expansion and maintenance activities.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for rendering by a mobile wireless data network problem impact server system, the server system comprising a processor and a non-transitory computer readable medium including computer-executable instructions executed by the processor, a human observable representation of problem impact at particular geographic units within a grid corresponding to a geographic area of interest, the method comprising:
    tabling mobile wireless communication network data in a database;
    generating, by the problem impact server, a problem impact grid for a geographic area of interest subdivided into sub-areas of specified dimensions, the generating a problem impact grid for a geographic area of interest comprising:
        creating a problem identification grid by applying a threshold test to the mobile wireless communication network data corresponding to each sub-area of the geographic area of interest, wherein a same non-zero value is assigned to each sub-area meeting the threshold test and otherwise assigning a zero value to each sub-area not meeting the threshold test,
        generating an initial problem extent severity grid by applying a first aggregating operation wherein, for each sub-area in the initial problem extent severity grid, an initial severity value is generated by totaling the values in the problem identification grid corresponding to: (1) the sub-area and (2) each adjacent neighboring sub-area, and
        generating the problem impact grid, from the initial problem extent severity grid by:
            initially performing a second aggregation operation wherein, for each sub-area in the problem impact grid, an intermediate summed value is generated by totaling the values in the initial problem extent severity grid corresponding to: (1) the sub-area and (2) each adjacent neighboring sub-area, and
            amplifying, by an amplification factor, the intermediate summed value for each sub-area corresponding to a sub-area assigned a non-zero value during the creating a problem identification grid; and
    rendering a listing representing a prioritized set of mobile wireless communication network issues arranged in accordance with magnitude of values assigned to sub-areas of the problem impact grid.

2. The method of claim 1 wherein the same non-zero value is an integer value.

3. The method of claim 2 wherein the integer value is 1.

4. The method of claim 1 wherein the threshold test applied to the sub-areas evaluates to a true/false answer.

5. The method of claim 1 wherein the sub-area is a square.

6. The method of claim 1 wherein the same non-zero value is 1 and the aggregating operation is a counting operation.

7. The method of claim 1 wherein the amplification factor is an integer value.

8. The method of claim 7 wherein the integer value is 2.

9. The method of claim 1 wherein the threshold test relates to dropped calls.

10. The method of claim 1 wherein the threshold test relates to signal quality for a mobile wireless device within a geographic location within a sub-area of the area of interest.

11. A non-transitory computer-readable medium including computer-executable instructions for rendering, by a mobile wireless data network problem impact server system from tabled mobile wireless communication network data in a database, a human observable representation of problem impact at particular geographic units within a grid corresponding to a geographic area of interest, wherein the rendering comprises:
    generating, by the problem impact server, a problem impact grid for a geographic area of interest subdivided into sub-areas of specified dimensions, the generating a problem impact grid for a geographic area of interest comprising:
        creating a problem identification grid by applying a threshold test to the mobile wireless communication network data corresponding to each sub-area of the geographic area of interest, wherein a same non-zero value is assigned to each sub-area meeting the threshold test and otherwise assigning a zero value to each sub-area not meeting the threshold test,
        generating an initial problem extent severity grid by applying a first aggregating operation wherein, for each sub-area in the initial problem extent severity grid, an initial severity value is generated by totaling the values in the problem identification grid corresponding to: (1) the sub-area and (2) each adjacent neighboring sub-area, and
        generating the problem impact grid, from the initial problem extent severity grid by:
            initially performing a second aggregation operation wherein, for each sub-area in the problem impact grid, an intermediate summed value is generated by totaling the values in the initial problem extent severity grid corresponding to: (1) the sub-area and (2) each adjacent neighboring sub-area, and
            amplifying, by an amplification factor, the intermediate summed value for each sub-area corresponding to a sub-area assigned a non-zero value during the creating a problem identification grid; and rendering a listing representing a prioritized set of mobile wireless communication network issues arranged in accordance with magnitude of values assigned to sub-areas of the problem impact grid.

12. The non-transitory computer-readable medium of claim 11 wherein the same non-zero value is an integer value.

13. The non-transitory computer-readable medium of claim 12 wherein the integer value is 1.

14. The non-transitory computer-readable medium of claim 11 wherein the same non-zero value is 1 and the aggregating operation is a counting operation.

15. The non-transitory computer-readable medium of claim 11 wherein the amplification factor is an integer value.

16. The non-transitory computer-readable medium of claim 11 wherein the threshold test relates to dropped calls.

17. The non-transitory computer-readable medium of claim 16 wherein the integer value is 2.

18. The non-transitory computer-readable medium of claim 11 wherein the threshold test relates to signal quality for a mobile wireless device within a geographic location within a sub-area of the area of interest.

19. A mobile wireless data network problem impact server system for rendering, from tabled mobile wireless communication network data in a database, a human observable representation of problem impact at particular geographic units within a grid corresponding to a geographic area of interest, wherein the server system comprises:
a processor, and
a non-transitory computer readable medium including computer-executable instructions executed by the processor to perform a method, during the rendering, comprising:
tabling mobile wireless communication network data in a database;
generating, by the problem impact server, a problem impact grid for a geographic area of interest sub-divided into sub-areas of specified dimensions, the generating a problem impact grid for a geographic area of interest comprising:
creating a problem identification grid by applying a threshold test to the mobile wireless communication network data corresponding to each sub-area of the geographic area of interest, wherein a same non-zero value is assigned to each sub-area meeting the threshold test and otherwise assigning a zero value to each sub-area not meeting the threshold test,
generating an initial problem extent severity grid by applying a first aggregating operation wherein, for each sub-area in the initial problem extent severity grid, an initial severity value is generated by totaling the values in the problem identification grid corresponding to: (1) the sub-area and (2) each adjacent neighboring sub-area, and
generating the problem impact grid, from the initial problem extent severity grid by:
initially performing a second aggregation operation wherein, for each sub-area in the problem impact grid, an intermediate summed value is generated by totaling the values in the initial problem extent severity grid corresponding to: (1) the sub-area and (2) each adjacent neighboring sub-area, and
amplifying, by an amplification factor, the intermediate summed value for each sub-area corresponding to a sub-area assigned a non-zero value during the creating a problem identification grid; and
rendering a listing representing a prioritized set of mobile wireless communication network issues arranged in accordance with magnitude of values assigned to sub-areas of the problem impact grid.

* * * * *